United States Patent
Byström

(10) Patent No.: US 11,486,606 B2
(45) Date of Patent: Nov. 1, 2022

(54) METHOD OF FORECASTING HEAT OUTPUT OF SOLAR COLLECTORS

(71) Applicant: ABSOLICON SOLAR COLLECTOR AB, Härnösand (SE)

(72) Inventor: Joakim Byström, Härnösand (SE)

(73) Assignee: ABSOLICON SOLAR COLLECTOR AB, Härnösand (SE)

( * ) Notice: Subject to any disclaimer, the term of this patent is extended or adjusted under 35 U.S.C. 154(b) by 78 days.

(21) Appl. No.: 17/043,871

(22) PCT Filed: Apr. 3, 2019

(86) PCT No.: PCT/SE2019/050308
§ 371 (c)(1),
(2) Date: Sep. 30, 2020

(87) PCT Pub. No.: WO2019/194734
PCT Pub. Date: Oct. 10, 2019

(65) Prior Publication Data
US 2021/0140683 A1    May 13, 2021

(30) Foreign Application Priority Data
Apr. 3, 2018 (SE) .................... 1850370-6

(51) Int. Cl.
*F24S 50/80*       (2018.01)
*F24S 23/74*       (2018.01)
(Continued)

(52) U.S. Cl.
CPC .............. *F24S 50/80* (2018.05); *F24S 23/74* (2018.05); *G01W 1/10* (2013.01); *G01W 1/12* (2013.01); *F24S 2201/00* (2018.05)

(58) Field of Classification Search
CPC ........ F24S 50/80; F24S 23/74; F24S 2201/00; G01W 1/10; G01W 1/15
(Continued)

(56) References Cited

U.S. PATENT DOCUMENTS 5,184,317 A    2/1993 Pickett
2010/0318297 A1    12/2010 Herzig et al.
(Continued)

FOREIGN PATENT DOCUMENTS

JP    2008-83971    *  4/2008
JP    2015183927 A  * 10/2015
(Continued)

OTHER PUBLICATIONS

English translation of JP 2008-83971, Apr. 2008. (Year: 2008).*
(Continued)

*Primary Examiner* — Michael P Nghiem
(74) *Attorney, Agent, or Firm* — Patent Portfolio Builders PLLC

(57) ABSTRACT

Method of forecasting heat output of a solar collector. First, heat output for a plurality of solar collectors is simulated, located at respectively different geographic locations but having the same solar collector settings as the solar collector to be forecasted. The simulation is performed by calculating a dataset of theoretical heat outputs for the plurality of solar collectors, based on acquired 802 related weather data. From the calculated dataset a function is adjusted 810, the function defining the theoretical heat output of any solar collector related to its geographic location, e.g. latitude, solar Direct Normal Irradiation, DNI, and collector settings, e.g. operation temperature, and forecasting the heat output of the solar collector based on the adjusted function.

7 Claims, 6 Drawing Sheets

(51) Int. Cl.
*G01W 1/10* (2006.01)
*G01W 1/12* (2006.01)

(58) Field of Classification Search
USPC .............................................................. 702/3
See application file for complete search history.

(56) References Cited

U.S. PATENT DOCUMENTS

| | | | |
|---|---|---|---|
| 2011/0282601 A1 | 11/2011 | Hoff | |
| 2015/0177415 A1* | 6/2015 | Bing | G01W 1/10 702/3 |
| 2018/0060278 A1 | 3/2018 | Lin et al. | |

FOREIGN PATENT DOCUMENTS

| | | |
|---|---|---|
| WO | 2011124226 A1 | 10/2011 |
| WO | 2013181408 A2 | 12/2013 |

OTHER PUBLICATIONS

English translation of JP2015183927, Oct. 2015. (Year: 2015).*

Bengt Perers et al., "Analytical model for the daily energy input/output relationship for solar collector systems," Document D11:1985, ISBN 91-540-4359-X, Swedish Council for Building Research, Stockholm, Sweden, 1985, pp. 1-43.

Bengt Perers et al., "Thermal performance of concentrating tracking solar collectors," DTU Civil Engineering Report R-292 (UK), Aug. 2013, 24 pages.

Andy Schoder, Solar Collector Power Output, https://web.archive.org/web/20130327035215/http:/landyschroder.com/SolarEnergyResearch/SolarCollectorPowerOutput.

Andy Schroder, How Solar Thermal Collector Performance Was Modeled, https://web.archive.org/web/20141201203131 /http://andyschroder.com/SolarEnergyResearch/HowCollectorWasModeled.

I. Filip et al., "Issues regarding mathematical modeling of wind aggregates," Applied Machine Intelligence and Informatics (SAMI), IEEE 9th International Symposium, Smolenice, Slovakia, Jan. 27-29, 2011, pp. 23-26.

International Preliminary Report on Patentability dated Jun. 25, 2020 in related/corresponding PCT Application No. PCT/SE2019/050308.

International Search Report/Written Opinion dated May 31, 2019 in related/corresponding PCT Application No. PCT/SE2019/050308.

* cited by examiner

Daily beam radiation in collector plane [kWh/m2/day]

METHOD OF FORECASTING HEAT OUTPUT OF SOLAR COLLECTORS

TECHNICAL FIELD

This disclosure relates to energy supply, especially to arrangements and methods for estimating heat output of thermal solar energy collectors. Within literature the terms "solar thermal" and "is sometimes used to disclose the technical field of making use of solar energy for heating.

BACKGROUND

In modern society energy is consumed by people and industries, e.g. for producing various products, for transport and production of food. Energy could be produced in several forms and from different energy sources. For instance, electricity is often produced from hydroelectric power plants, combustion of coal, oil, or gas. Traditionally, heat has been produced from local combustion or district heating power plants.

With an increasing population and demands for services, energy consumption strongly increases which significantly negatively affects our environment. Combustion produces large amount of carbon dioxide and other greenhouse gases. Hydroelectric power plants require large territories to be drowned, etc.

In order to reduce our footprint and negative impression on our environment, demands have been raised for more clean and environmental friendly energy production. Today, renewable energy is produced from wind, sun, ocean waves, etc. The sun provides large amounts of energy to our planet in form of radiated sun beams. Solar radiation can be used by solar cells to generate electricity, e.g. in form of solar panels, or by solar collectors to generate thermal heat.

A concentrating solar collector uses mirrors, lenses, or combinations thereof, to focus the solar radiation in form of a point or a line. In trough-formed concentrating solar collectors a reflector is formed as a curved elongated mirror, which reflects the solar radiation on a receiver arranged along a focus-line of the reflector. The receiver is commonly a black tube filled with a transport fluid, such as water, glycol, or oil. The tube is heated by the concentrated solar radiation and the heat is transferred to the transport fluid that is circulated in a system where the heated transport fluid could be used. The heated transport fluid may be used both as process heat in industrial processes as for district heating.

The term "PTC" (Parabolic Trough solar Collector) will be used in this disclosure to denote a concentrating solar collector with a trough-formed reflector arranged to concentrate solar light onto a fluid carrying tube also called receiver. Typically, PTCs will be pivoted to track the sun during the day and are controlled by a solar tracking arrangement.

A parabolic trough solar collector comprises an elongated reflector, which reflective surface in a cross-section describes a parabolic curve. The reflector focuses direct sunlight on a focus.

To estimate the performance of installations of solar thermal collector fields simulation programs are typically used to take environmental factors into account when calculating a likely annual yield of a solar thermal collector field.

It is a challenge to efficiently estimate appropriate and precise heat outputs for installations of solar thermal collector fields. Even when measurements of solar Direct Normal Irradiation (DNI) have been performed, the heat output may vary substantially, e.g. due to the structure of the installations, as orientation, type of solar collectors, local environmental characteristics.

BRIEF DESCRIPTION OF DRAWINGS

The solution will now be described in more detail by means of exemplifying embodiments and with reference to the accompanying drawings, in which.

SUMMARY

Figure 1:
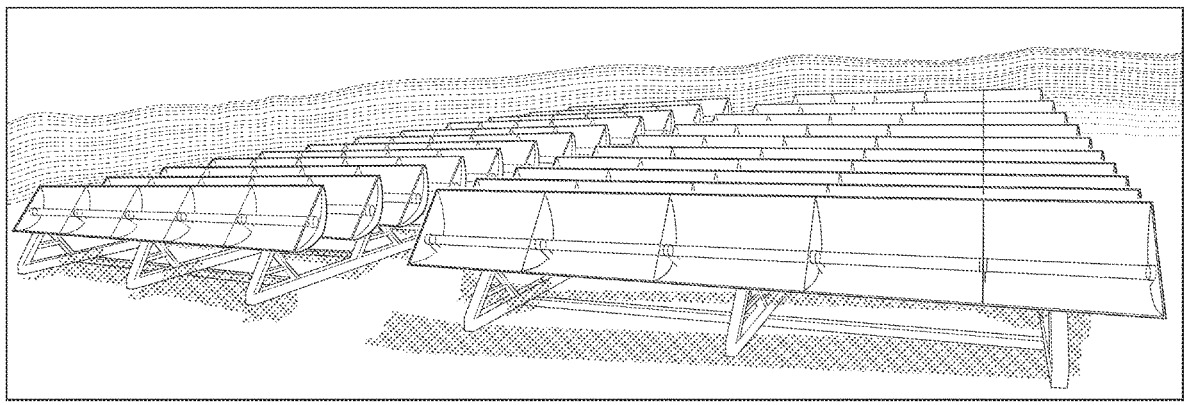
FIG. 1 is a photo impression of a collector array with Absolicon PTC collectors.

It would be desirable to achieve a precise estimate when evaluating potential thermal solar installations. It is an object of this disclosure to address at least one of the issues outlined above. Further there is an object to provide a process that is fast, precise, and simple to make use of for end-users. These objects may be met by a method according to the attached independent claims.

According to a first aspect, a method is provided for forecasting heat output of a solar collector. The method comprising simulating the heat output for a plurality of solar collectors located at respectively different geographic locations. The plurality of solar collectors is of the same type and have the same solar collector settings, e.g. operation temperature, as the solar collector to be forecasted. The simulation is performed by calculating a dataset of theoretical heat output for the respective ones of the plurality of solar collectors, based on acquired related weather data, e.g. solar radiation and ambient temperature.

Further, the method comprises adjusting a function to the calculated dataset, the function defining the theoretical heat output of any solar collector related to its geographic location, e.g. latitude, solar Direct Normal Irradiation, DNI, and collector settings, e.g. operation temperature, and forecasting the heat output of the solar collector based on the adjusted function.

Furthermore, when performing the method, the related weather data may have a higher time resolution than the solar DNI, e.g. a one-hour time resolution for the related weather data and a one-year time resolution for the solar DNI.

The adjusted function may define the theoretical heat output Q as $Q = k1(lat) * DNI * \cos(lat) + k2(lat)$, where $k1$ and $k2$ are two respective sub-functions, lat is the latitude of the solar collector's location, and DNI is related to the solar collector's location.

Moreover, the method may comprise an additional action of calculating a shaded matrix map of Q-values of geographic locations according to the adjusted function, wherein the forecasting is performed for a geographic location selected from the shaded matrix map.

According to a second aspect a computer program is provided which, when executed on at least one processor, causes the at least one processor to carry out the method according to the first aspect.

According to a third aspect a carrier is provided which comprises the computer program according to the second aspect, wherein the carrier is one of an electrical signal, an optical signal, a radio signal, or a computer readable storage medium.

A new concentrating parabolic trough collector (PTC), also referred to as "Parabolic Trough solar Collector" within prior art publications, design is under market introduction by Absolicon Solar Collector AB. To support the sales and marketing and increasing the general scientific knowledge about these collectors, this work is done to create a tool for quick performance estimates, at any place on earth where solar radiation data is available. A special simulation tool for this collector and array design, has been developed to manage different axis directions and also tilt of the tracking axis. Also shading between the collector rows is carefully corrected for. This was found to be an important factor for collector fields of this design and necessary to optimize the field design. The model is also validated against long term measurements at DTU (Technical University of Denmark) on a small demonstration PTC collector array and also checked against other simulation tools using the same parameters and weather data. By the disclosed methods an estimate of global performance of solar collector installations or arrangements may be appropriately maintained with high precision.

When traditional methods for estimating heat output require substantial amounts of measurements and processing capacity, the proposed method may instead enable an efficient and appropriate method of producing precise estimations of heat output.

Figure 7:
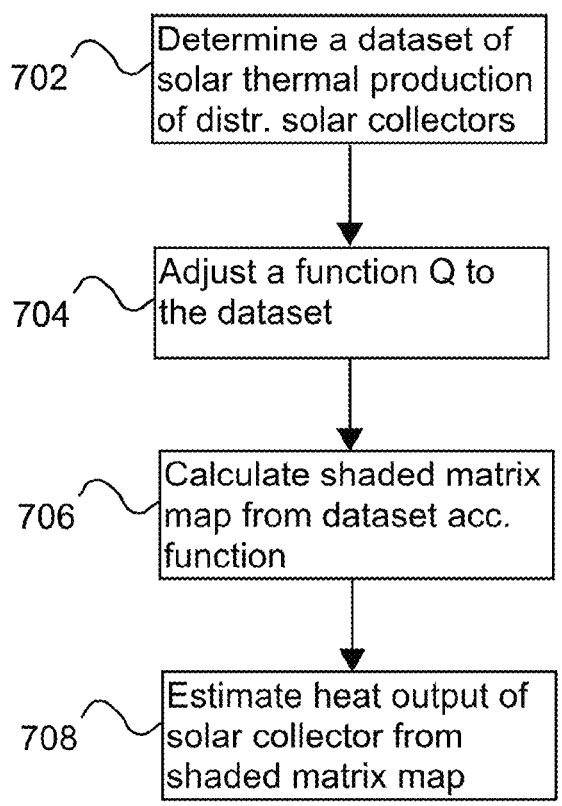
FIG. 7 is a schematic flow chart of a method of estimating heat output according to possible embodiments.

With reference to FIG. 7, which is a schematic flow chart, a method 700 of estimating heat output of a solar collector for a specific solar collector setting, at a geographic location of the solar collector will now be described in accordance with one exemplifying embodiment.

In an initial action 702, a dataset is determined of solar thermal production (i.e. heat output) of a plurality of globally distributed solar collectors from measurements performed at the plurality of solar collectors, the plurality of solar collectors being of the same type and have the same specific solar collector setting, e.g. orientation, as the solar collector to be estimated. For instance, the types may be planar of concentrating solar collectors, and the settings may represent various orientations, locations, etc. It is to be noted that the described initial action 702 of determining the dataset of solar thermal production (i.e. heat output) may have been performed in advance, i.e. not in conjunction with the following actions 704, etc.

Then in a following action 704, a function Q is adjusted to the determined dataset, the function defining a relation between the solar thermal production (i.e. heat output), the solar DNI (Direct Normal Irradiation) and the latitude of the plurality of globally distributed solar collectors for the specific solar collector setting. The function Q may comprise a plurality of sub-functions $k_1(lat)$, $k_2(lat)$, which respectively may be dependent on the latitude. One possible function $Q=k_1(lat)*DNI*cos(lat)*k_2(lat)$.

In a subsequent action 706, a shaded matrix map is calculated based on a dataset of solar DNI, of a geographic region, e.g. the Earth, and latitudes, according to the adjusted 704 function. One advantage with such a shaded matrix map is that it accurately illustrates potential thermal production with high precision at different locations of a geographic region, where a traditional solar DNI map only illustrates a rough estimate based on low time resolution data. The solar DNI map does not take solar collector settings, such as operation temperature and various installation parameters such as tilts, orientations etc.

Finally, in an action 708, the heat output of the solar collector is estimated based on the shaded matrix map and the geographic location of the solar collector.

In an alternative embodiment, which is related to the above described one, calculating 706 the shading matrix map comprises, adding or subtracting two different adjusted 704 functions originating from respective different determined 702 datasets. The resulting shaded matrix map of this embodiment may enable a precise estimate of heat output to be formed by comparing two different functions originating from different datasets, e.g. relating to different types or settings of solar collectors, without having to perform individual measurements of both types/settings at a potential solar collector location. Thereby, a cost-efficient and convenient method for evaluating potential installations, may be achieved.

DESCRIPTION

Estimating performance of potential installations of solar thermal collector fields is often a complex task and this is a hinder to the development of the solar thermal sector. One way to help this situation is by developing map tools that estimate the output.

Renewable energy maps have been important tools to estimate expected outputs for potential or already installed power plant installations for various types of energy production. Wind power maps has shown where it could be advantageous to locate wind power installations, and PhotoVoltaic (PV) maps where to install solar panels, etc.

However, for solar thermal, no one has been able to make a map which with accurate precision forecasts potential energy production. The reason is the many complex variables and local differences—a few kilometres may change the heat output considerably.

The method invented comprises first a simulation of a solar thermal installation at a given location. This is a demanding calculation. After doing simulations for thousands of different locations, the data has been aggregated to a simplified function. This is the product generated. From this simplified function, a shaded matrix map of future heat output of potential solar collector installations could be calculated.

This disclosure will describe a novel simulation model, for the annual yield of parabolic trough collectors, including shading in the field. The model may be applied for simulation and validation of heat output for solar collector installations at various geographic locations.

Figure 2:
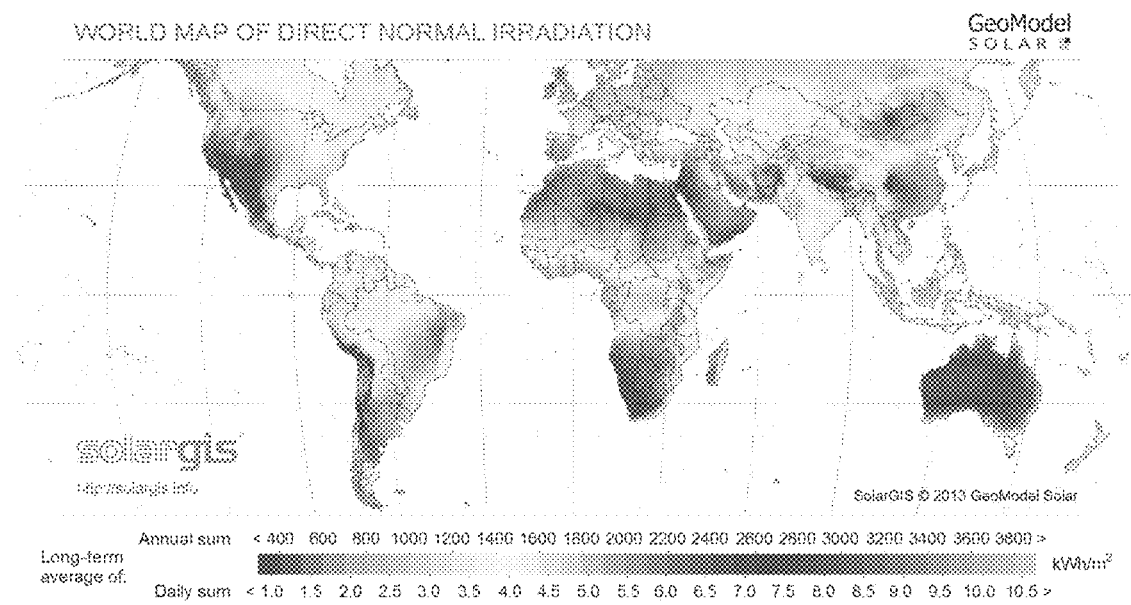
FIG. 2 is a World map of solar Direct Normal Irradiation according to an example.

A way to present geographic data is by using shaded matrix elements, where the colour or shading of the element is depending on the value of the matrix element. This is also called a heat map, but to avoid confusion the term "shaded matrix map" is used in this document. FIG. 2, which illustrates solar Direct Normal Irradiation on a world map, is one example of a heat map. In the corresponding national patent application SE 1850370-6 from which this patent application claims priority, by mistake "Incident" was written instead of "Irradiation". It is obvious from the context that this was a typographic mistake, which we now correct in this disclosure.

Furthermore, within this disclosure, the term "heat output" will be used on some instances when referring to "solar thermal production" of solar collectors. Both terms correspond to each other.

1. Introduction

A new concentrating parabolic trough solar collector (PTC), design is under market introduction by Absolicon Solar Collector AB, see FIG. 1. To support the sales and marketing and increase the scientific understanding or knowledge of this collector type this work is done to create quick performance estimates at any place on earth where solar radiation data is available. Both a small demo array tested at DTU (Technical University of Denmark) and simulations have shown that accurate treatment of both direct and diffuse shading in an array is important to get accurate annual performance results. The diffuse shading will be corrected for This is often neglected for PTC collectors. I.e. The diffuse shading will here be corrected for which is often neglected for PTC collectors.

Figure 3:
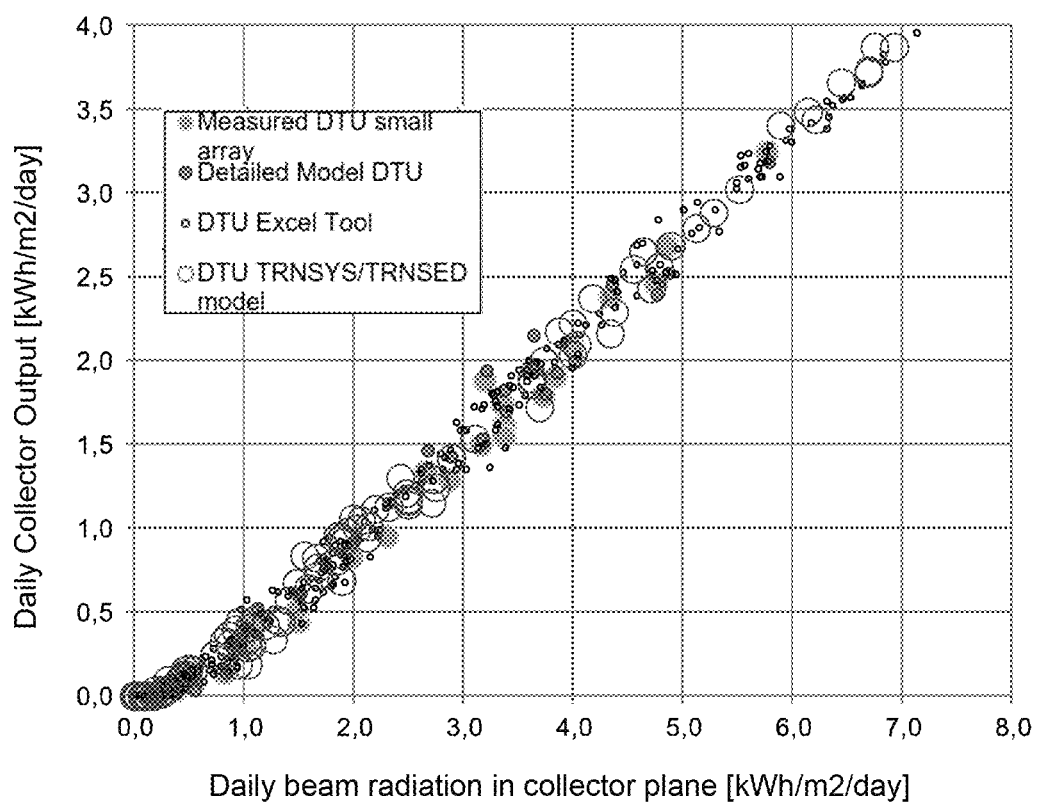
FIG. 3 is a graph showing results of a simulation performed with a method, according to possible embodiments. I.e. output results of simulations performed with different methods and compared to measured output.

This also has influences on PTC collector testing that is not yet fully taken into account, as it involves the anisotropy of the diffuse radiation, that is not yet fully characterized for this collector type. But validation, FIG. 3, shows that there already is a good agreement between measured and calculated thermal performances.

2. The Simulation Tool

The simulation program, in this project, is developed in TRNSYS (TRaNsient SYstems Simulation) and then transferred to a TRNSED version. However, even if TRNSYS which is a simulation program primarily used in the fields of renewable energy engineering and building simulation for passive as well as active solar design, and TRNSED version have been applied in these methods, The concept is not limited to application of any specific program or software and could be implemented also by means of any suitable alternative program software or hardware where appropriate.

The type of weather data .TM2, has been chosen to have a large global coverage for average year climate data, and still keep a good accuracy.

The TRNSYS work is focused on an accurate but simplified modelling that is directly connected to standardized collector test results and the model used there. Compared to simplified tools like ScenoCalc also shading between collector rows is modelled carefully. Also ease in changing between many climate files has priority.

A main goal is also to get a fast tool, to allow many simulations in a short time. This is needed for optimization runs and also investigations of the variability of performance globally from country to country and for different locations within a country. The correlation to DNI, sunshine duration and latitude is of special interest.

A validation of the simulation tool is shown in FIG. 3. It is in the form of an Input/Output diagram [2] that allows measured and simulation results to be compared, even if the weather data is not exactly the same. The test is done at DTU in the northern part of Copenhagen and the TRNSYS weather data is for Taastrup just west of Copenhagen. In FIG. 3, validation of the Simulation tool (large rings) versus PTC array measurements at DTU (green dots, i.e. in the figure seen as dots with light circumference), an excel DTU tool (small rings), and DTU detailed modelling (red dots, i.e. in the figure seen as dots with dark circumference) are shown.

3. Results

Preliminary studies have shown that in the climates where most people live, the difference between North-South (NS) and East-West (EW) tracking axis-direction is not so large for a collector field, as one could expect. But this is first when taking array shading between rows into account. Though for a single trough without near and far shading, most often NS axis, gives the highest annual performance, as is commonly assumed. The annual distribution of the thermal performance is most even for East West axis directions so a larger solar fraction is possible then.

The daily distribution of energy output varies with axis direction and of course altitude. This can be used to adapt solar energy production to the load from case to case. The annual energy production for an array is not affected so much by the axis orientation as one could expect see FIG. 4.

Figure 4:
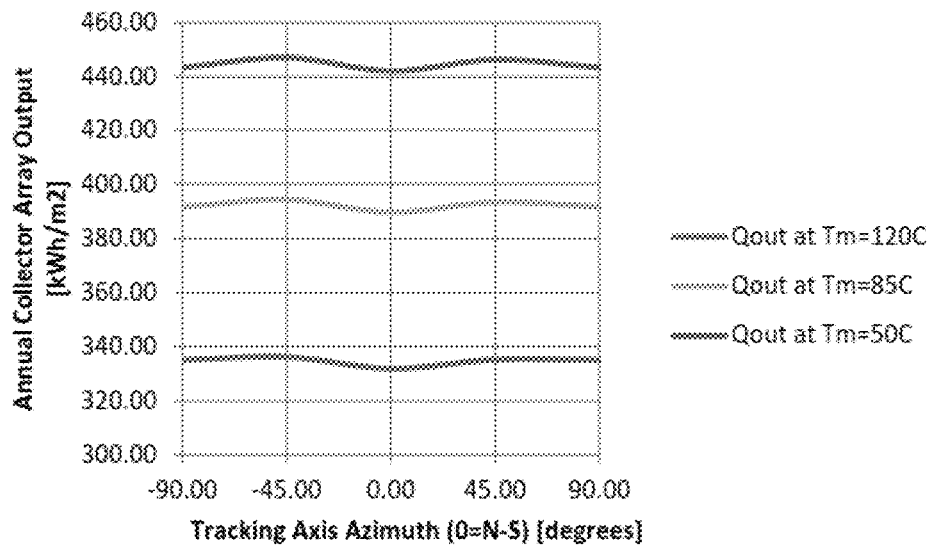
FIG. 4 is a graph showing results of heat output of a collector array according to possible embodiments.
Figure 5:
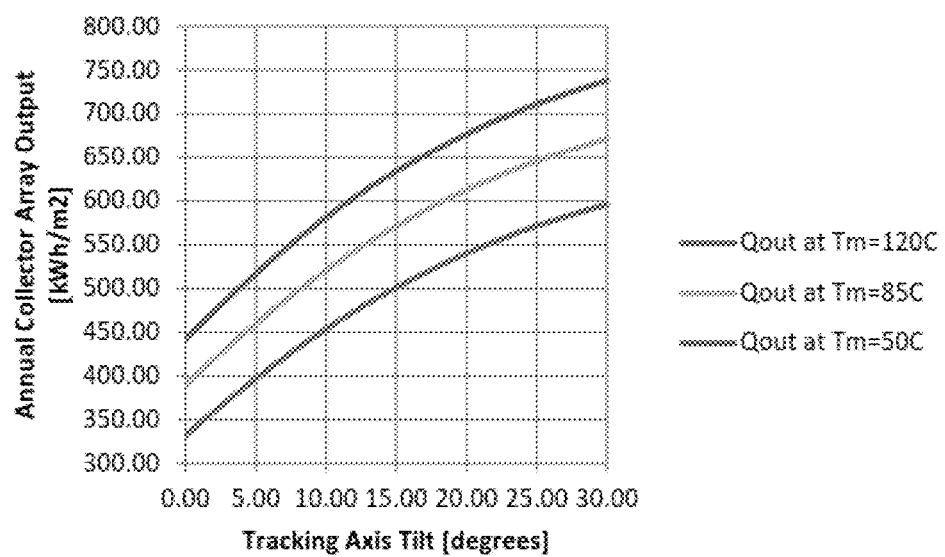
FIG. 5 is a graph showing results of heat output of a collector array according to possible embodiments.

The FIGS. 4 and 5 illustrate various aspects of performance of a PTC collector array versus tracking axis azimuth direction from south and axis tilt angle from horizontal. Regarding both these figures, the climate is for North Jutland Denmark, at a Gross Area used for performance for an array with 20 rows. Tm=Mean Operating Temperature in ° C. and Azimuth: 90=West, 0=South, and −90=East. At a Tilt of 0°, the trough is oriented horizontally.

Therefore, axis directions in between classical NS and EW, like SE or SW can be utilized to match the load better and maybe give easier installation on site, if the ground area or roof borders are not perfectly NS and EW [1]. FIG. 4 shows the annual thermal performance variation with tracking axis direction. 0=North South, −90 and 90 is East West direction. Note that there is a tendency to better performance in between the classical tracking axis directions N-S and E-W. This is an example for a standard array with closely packed troughs with row distance 1.4 m, trough width 1.06 m and 20 rows.

FIG. 4 illustrates annual thermal performance variation with tracking axis direction. 0=North South −90 and 90 is East West direction. Note that there is a tendency to better performance in between the classical axis directions. Weather data is from North Jutland, Denmark.

Further it is found that even small tracking axis tilt angles towards the equator, can improve the performance quite significantly especially at high latitudes. Preliminary studies have shown that small axis tilts increase the performance by 1% per degree tilt at high latitudes like in Denmark. We think this extra enhancement above the effect of more beam radiation in the PTC collector plane, by tracking axis tilt, is partly due to less inter-array shading.

FIG. 5. Performance enhancement by tracking axis tilt, for a PTC operating in the North Jutland climate.

Figure 6:
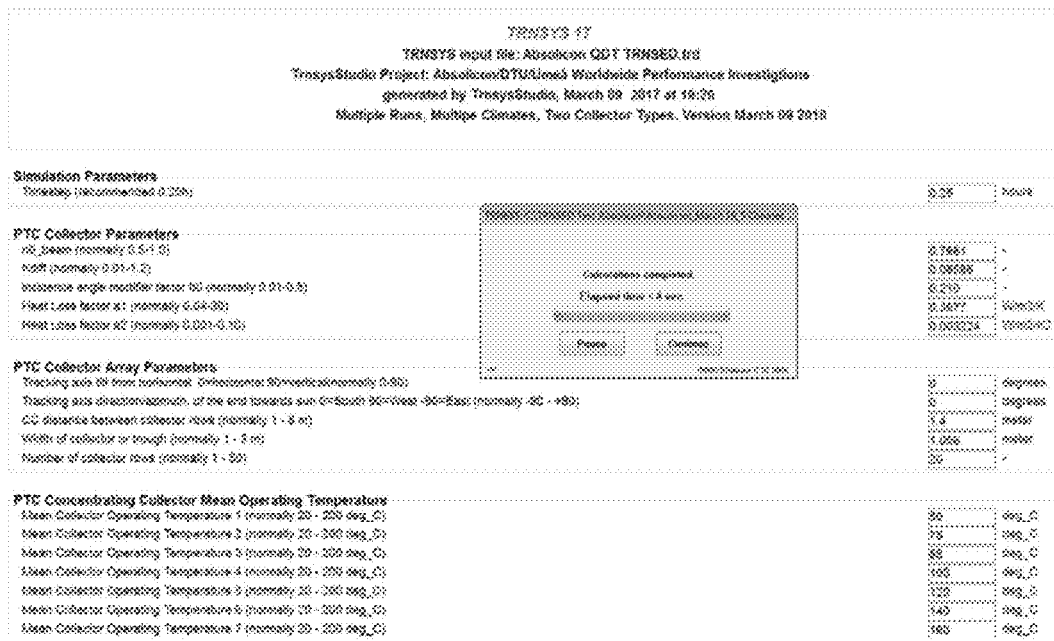
FIG. 6 is a screenshot of an interface when performing a method according to possible embodiments.

With reference to FIG. 6, a screenshot of the simulation tool's input menu is illustrated in a non-limiting manner.

4. Conclusions

A simulation tool is under development to investigate performance of PTC collector arrays worldwide.
The tool has been validated against measurements on a small array at DTU in Denmark.
The calculations so far indicate that the exact tracking axis direction is not so critical in a wide range of latitudes. This gives a freedom in installation of an array depending on local conditions for load profile and available area for the collector field.

A load adaptation can be achieved by optimizing the axis direction for each case.

Even small tilts of the tracking axis towards the equator can give significant annual performance improvements at high latitudes.

REFERENCES

[1] Bengt Perers, Simon Furbo and Janne Dragsted. Thermal performance of concentrating tracking solar collectors. DTU Byg report R-292. August 2013.
[2] Bengt Perers, Heimo Zinko, Per Holst. Analytical model for the daily energy input/output relationship for solar collector systems. Document D11:1985. ISBN 91-540-4359-X. Swedish Council for Building Research.

NUMBERED EXEMPLIFYING EMBODIMENTS (NEES)

NEE 1. Method (700) of estimating heat output of a solar collector for a specific solar collector setting, at a geographic location of the solar collector, the method comprising:
determining (702) a dataset of solar thermal production of a plurality of globally distributed solar collectors from measurements performed at the plurality of solar collectors, the plurality of solar collectors being of the same type and have the same specific solar collector setting as the solar collector to be estimated,
adjusting (704) a function to the determined (702) dataset, the function defining a relation between the solar thermal production and the latitude of the plurality of globally distributed solar collectors for the specific solar collector setting,
calculating (706) a shaded matrix map based on a dataset of solar Direct Normal Irradiation, DNI, of a geographic region, e.g. the Earth, and latitudes, according to the adjusted (704) function, wherein
the heat output of the solar collector is estimated (708) based on the shaded matrix map and the geographic location of the solar collector.
NEE 2. The method (700) according to NEE 1, wherein calculating (706) the shading matrix map comprises, adding or subtracting two different adjusted (704) functions originating from respective different determined (702) datasets.
NEE 3. The method (700) according to NEE 1 or 2, wherein the adjusted (704) function relating solar thermal production Q, to solar DNI and latitude is:

$$Q = k_1(\text{lat})*\text{DNI}*\cos(\text{lat}) + k_2(\text{lat}), \text{ where}$$

$k_1$ and $k_2$ are two respective sub-functions dependent on the latitude.

Figure 8:
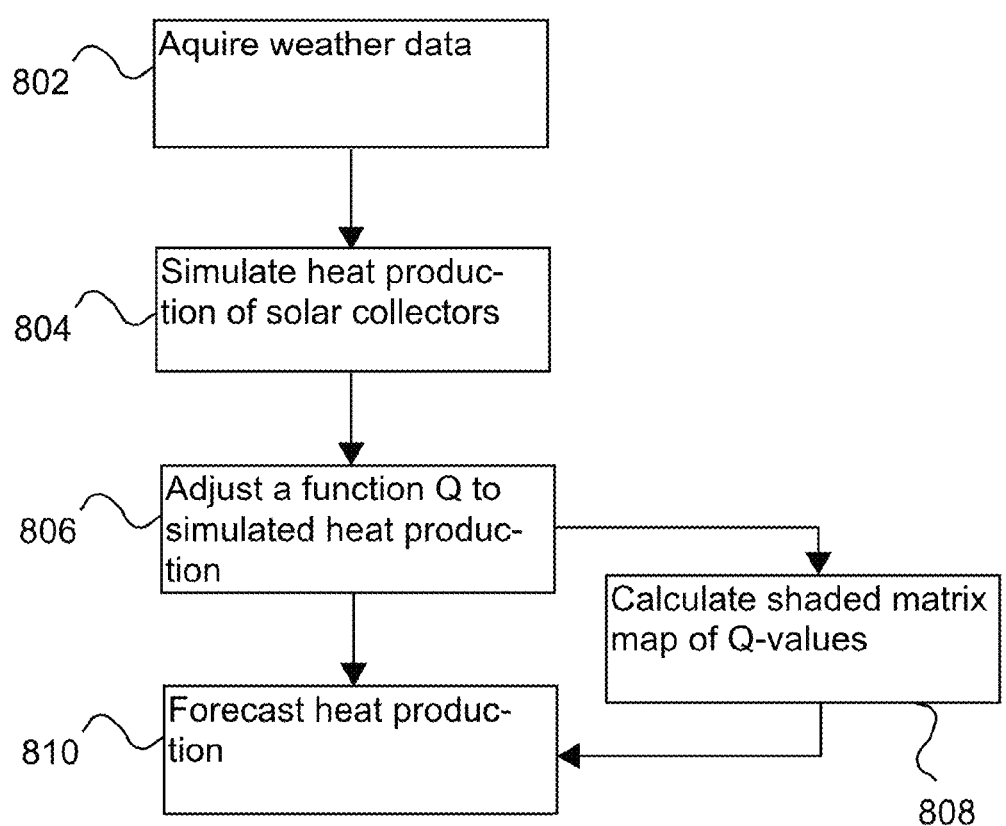
FIG. 8 is a schematic flow chart of a method of estimating heat output according to possible embodiments.

With reference to FIG. 8, which is a schematic flow chart, a method of forecasting heat output of a solar collector will now be described in accordance with one exemplifying embodiment.

Even if this exemplifying embodiment is related to concentrating parabolic trough solar collectors, so called PTCs, the proposed concept is not limited thereto. The proposed concept may also be applied to forecast heat output of other types of solar thermal collectors, and for combinations of solar thermal/photovoltaic collectors.

In an initial action 804, heat outputs of a plurality of solar collectors located at respectively different geographic locations are simulated. For the simulation acquired weather data is used, e.g. solar radiation and ambient temperature. These weather data are available often with a time resolution of one hour and is commonly produced by national meteorological authorities or private companies. The simulation achieves theoretical heat output data for a plurality of virtual solar collector of the same type and with corresponding solar collector settings as the solar collector to be forecasted. The virtual solar collectors are considered to be arranged at location where measured weather data for normal years is available.

When performing the simulation, the theoretical heat output for each weather data measurement is used and results in a dataset of calculated theoretical heat output values with a time resolution corresponding with the weather data. For a one-hour time resolution, the resulting calculated dataset will have 24*365=8560 values for each virtual solar collector.

In a following action 806, a function Q is adjusted to the calculated dataset to define the theoretical heat output of any solar collector related to its geographic location, e.g. latitude, solar DNI, and collector settings, e.g. operation temperature. In this embodiment, the function Q defines the theoretical heat output as:

$$Q = k1(\text{lat})*\text{DNI}*\cos(\text{lat}) + k2(\text{lat}), \text{ where}$$

k1 and k2 are two respective linear sub-functions, lat is the latitude of the solar collector's location, and DNI is related to the solar collector's location. In this embodiment, the dataset is adjusted to the function Q with means of linear regression, However, the function Q is a non-limiting implementation for achieving an accurate forecast of heat output with high precision, but alternative suitable functions may be applied when appropriate.

Finally, in an action 810, the heat output is forecasted for the solar collector with the adjusted function Q for its location, i.e. its lat-value, and the DNI of its location. Because the calculation-heavy simulations and the adjustment of the function Q can be prepared in advance for acquired weather data, an end user, e.g. a potential customer or power plant designer will be able to get a fast but reliable estimate of a potential heat output from an appropriate function for its solar collector type and settings. He/she does not need to perform actual simulations or measure at a plurality of installations himself. The typical potential heat output will have a lower time resolution than the weather data. In this embodiment, the time resolution for weather date is one measurement per hour, and the forecast results in an annual yield of heat output, i.e. a time resolution of once a year.

In a related exemplifying embodiment, a further action 808 of calculating a shaded matrix map is performed after adjusting the function Q. In this optional action, the theoretical heat output Q is calculated for the latitude and DNI of a DNI map. The resulting shaded matrix map is a detailed map from which the end user may get a rough estimate of interesting locations to perform the forecasting 810 for.

To enable and offer a service of forecasting heat output from potential solar collector installations, a provider may prepare taylor-made functions Q for different types of solar collectors and settings. These functions Q may be accessible online from a server of the provider or be cloud based. Potential customers or power plant designers may download an app or access a web-site where they can input their appropriate collector types and settings to forecast potential heat outputs.

Even if the simulations 804 are focused on calculations of theoretical heat outputs of virtual solar collector located near weather measuring stations for which weather data is available, the concept may be variated without deviating from the inventive concept. For instance, measured heat outputs for real solar collector installations may be used as complement or alternative when appropriate weather data is available.

Furthermore, the method may comprise the action 802 of acquiring the weather data to be applied for the simulation 804 as an alternative to acquiring these weather data from an external provider.

Reference throughout the specification to "one embodiment" or "an embodiment" is used to mean that a particular feature, structure or characteristic described in connection with an embodiment is included in at least one embodiment.

Thus, the appearance of the expressions "in one embodiment" or "in an embodiment" in various places throughout the specification are not necessarily referring to the same embodiment. Further, the particular features, structures or characteristics may be combined in any suitable manner in one or several embodiments. Although the present invention has been described above with reference to specific embodiments, it is not intended to be limited to the specific form set forth herein. Rather, the invention is limited only by the accompanying claims and other embodiments than the specific above are equally possible within the scope of the appended claims. Moreover, it should be appreciated that the terms "comprise/comprises" or "include/includes", as used herein, do not exclude the presence of other elements or steps.

Furthermore, although individual features may be included in different claims, these may possibly advantageously be combined, and the inclusion of different claims does not imply that a combination of features is not feasible and/or advantageous. In addition, singular references do not exclude a plurality. Finally, reference signs in the claims are provided merely as a clarifying example and should not be construed as limiting the scope of the claims in any way.

The scope is generally defined by the following independent claims. Exemplifying embodiments are defined by the dependent claims.

The invention claimed is:

1. A method of forecasting heat output of a solar collector, the forecasting being based on the solar collector's location and solar Direct Normal Irradiation (DNI), according to a function, the function resulting from in advance performed, wherein the method comprises:
   simulation of a heat output for a plurality of solar collectors located at respectively different geographic locations, wherein each of the plurality of solar collectors are of a same type and have same solar collector settings as the solar collector to be forecasted, by, with a simulation software ran on a computer, calculating a dataset of theoretical heat output for each of the plurality of solar collectors based on acquired related weather data of each of the plurality of solar collectors, and
   adjustment of the theoretical heat output for each of the plurality of solar collectors, with the computer, wherein the adjusted theoretical heat output of each of the plurality of solar collectors is based on a geographic location of each of the plurality of solar collectors, solar DNI, and solar collector settings,
   wherein the simulation is performed for acquired related weather data having a higher time resolution than the solar DNI,
   wherein each of the plurality of solar collectors uses one or more of mirrors and lenses to focus solar radiation in form of a point or a line onto a receiver which contains a heatable transport fluid.

2. The method according to claim 1, wherein when adjusting the theoretical heat output,
   the geographic location of each of the plurality of solar collectors comprises a latitude, and
   the solar collector settings comprises an operation temperature.

3. The method according to claim 1, further comprising in advance calculating a shaded matrix map of Q-values of geographic locations according to the adjusted theoretical heat output, wherein the forecasting is performed for a geographic location selected from the shaded matrix map.

4. A computer program stored on a non-transitory computer readable medium, comprising instructions which, when executed on at least one processor, cause the at least one processor to carry out the method according to claim 1.

5. A method of forecasting heat output of each of a plurality of solar collectors, the forecasting being based on the solar collector's location and solar Direct Normal Irradiation (DNI), according to a heat output function, the method comprising:
   simulating the heat output for each of the plurality of solar collectors located at respectively different geographic locations, by, with a simulation software running on a computer, calculating a dataset of theoretical heat output for each of the plurality of solar collectors, based on acquired related weather data associated with solar radiation and ambient temperature, and
   adjusting the theoretical heat output for each of the plurality of solar collectors, with the computer, wherein the adjusted theoretical heat output of each of the plurality of solar collectors is based on a geographic location of each of the plurality of solar collectors, solar DNI data and solar collector settings,
   wherein the simulating is performed for the acquired related weather data which has a higher time resolution than the solar DNI data,
   wherein each of the plurality of solar collectors uses one or more of mirrors and lenses to focus solar radiation in form of a point or a line onto a receiver which contains a heatable transport fluid.

6. The method of claim 5, wherein the acquired related weather data has a one-hour time resolution and the solar DNI data has a one-year time resolution.

7. The method of claim 5, wherein each of the plurality of solar collectors is a parabolic trough collector which is pivotable to track the sun during the day.

* * * * *